United States Patent
Wan et al.

(10) Patent No.: US 11,823,498 B1
(45) Date of Patent: Nov. 21, 2023

(54) SYSTEMS AND METHODS FOR HAND POSE ESTIMATION FROM VIDEO

(71) Applicant: META PLATFORMS TECHNOLOGIES, LLC, Menlo Park, CA (US)

(72) Inventors: Chengde Wan, Redmond, WA (US); Randi Cabezas, Redmond, WA (US); Xinqiao Liu, Medina, WA (US); Ziyun Li, Bellevue, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 300 days.

(21) Appl. No.: 17/384,209

(22) Filed: Jul. 23, 2021

(51) Int. Cl.
*G06V 40/20* (2022.01)
*G06F 3/01* (2006.01)
*G06T 7/70* (2017.01)

(52) U.S. Cl.
CPC .............. *G06V 40/28* (2022.01); *G06F 3/017* (2013.01); *G06T 7/70* (2017.01)

(58) Field of Classification Search
CPC ............ G06V 40/28; G06F 3/017; G06T 7/70
See application file for complete search history.

(56) References Cited

U.S. PATENT DOCUMENTS

| 11,625,838 B1* | 4/2023 | Narapureddy | G06V 10/40 382/103 |
| 2016/0335790 A1* | 11/2016 | Fleishman | G06T 7/143 |
| 2022/0108468 A1* | 4/2022 | Nakamura | G06V 40/103 |
| 2023/0194882 A1* | 6/2023 | Yu | G06F 3/013 359/13 |

* cited by examiner

*Primary Examiner* — Md K Talukder
(74) *Attorney, Agent, or Firm* — Greenberg Traurig, LLP

(57) ABSTRACT

The disclosed computer-implemented method may include (1) receiving a present frame of a video stream, the present frame comprising a present depiction of a multi-segment articulated body system, (2) identifying a previous frame of the video stream that comprises a previous depiction of the multi-segment articulated body system, (3) analyzing the present frame and the previous frame to determine whether the multi-segment articulated body system remained substantially rigid between the previous frame and the present frame, and (4) estimating a pose of the multi-segment articulated body system in the present frame using a first pose estimation computation that treats the multi-segment articulated body system as rigid and that is selected in contrast to a second pose estimation computation based on determining that the multi-segment articulated body system remained substantially rigid between the previous frame and the present frame. Various other methods, systems, and computer-readable media are also disclosed.

20 Claims, 10 Drawing Sheets

SYSTEMS AND METHODS FOR HAND POSE ESTIMATION FROM VIDEO

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
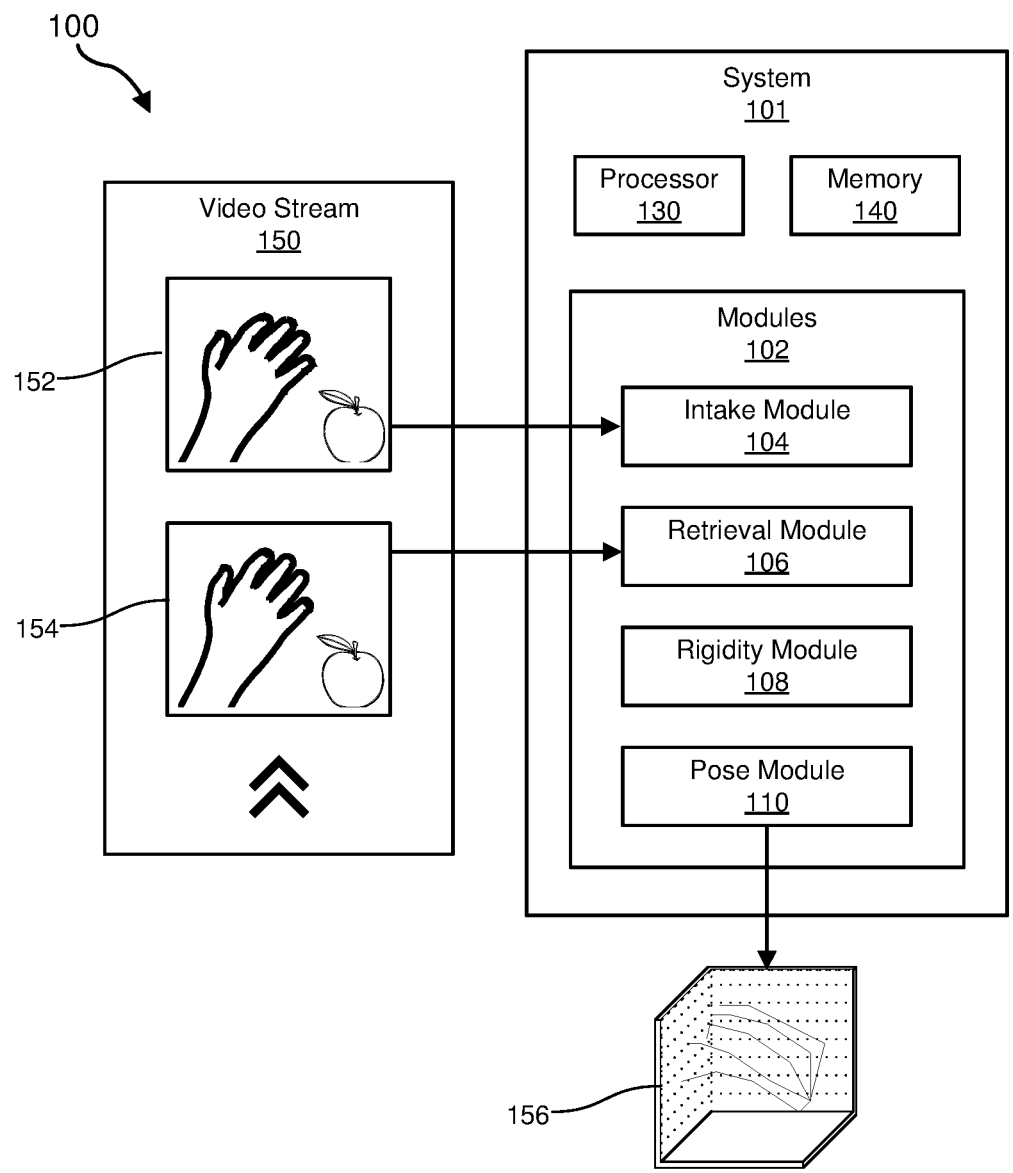
FIG. 1 is a diagram of an exemplary system for hand pose estimation from video.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Computer vision systems may translate images and/or video streams into models of the world. For example, a computer vision system may map two-dimensional images of objects (including, e.g., the human body) onto a three-dimensional space. One example of this is to extract hand pose information from video images of a human hand.

Accurately estimating hand poses from video is computationally expensive due to the complex dynamics of hand poses and structural dependencies between hand joints. This may create an undesired tradeoff between the accuracy, speed, reliability, and/or computational complexity of estimating hand poses. However, a precise and accurate understanding of hand poses may be valuable or even crucial for various applications.

The present disclosure is generally directed to systems and methods for estimating poses of articulated portions of the human body (e.g., hands) from video. In some cases, hands may maintain rigid from one moment to the next (e.g., due to holding an object, such as a bottle), meaning that the relative positions and orientations of the hand joints remain the same. Systems and methods described herein may exploit this fact to more efficiently estimate a rigid hand pose by estimating only a translation and rotation of the entire hand. Fortunately, the computational cost of detecting a rigid hand from video may be very small compared to the computational cost of dynamically estimating a hand pose from video. Furthermore, hands may be expected to be rigid a significant proportion of the time. Thus, by first detecting whether a hand has remained rigid before determining whether to perform an expensive hand pose estimation computation or a relatively inexpensive gesture prediction computation that assumes hand rigidity, the systems and methods described herein may significantly reduce the expected computational costs of accurately estimating hand poses from video.

As will be explained in greater detail below, embodiments of the present disclosure may improve the functioning of a computer by improving the computational efficiency and/or accuracy with which the computer determines hand poses from video. In addition, in some examples these embodiments may improve the functioning of a computer by improving the performance of tasks for which the computer relies upon quick and/or accurate hand pose information (e.g., tasks that take hand pose information and/or hand gesture information as input, such as a user interface system). Furthermore, embodiments of the present disclosure may improve the field of computer vision by improving the accuracy and/or reducing the computational resources required for extracting hand pose information from video. The various embodiments mentioned above and additional embodiments will be described in greater detail below with regard to computing environment 100 of FIG. 1, computer-implemented method 200 of FIG. 2, and the embodiments depicted in FIGS. 3-8.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 illustrates a computing environment 100 that includes a computer system 101. The computer system 101 includes software modules, embedded hardware components such as processors, or a combination of hardware and software. The computer system 101 is substantially any type of computing system including a local computing system or a distributed (e.g., cloud) computing system. In some cases, the computer system 101 includes at least one processor 130 and at least some system memory 140. The computer system 101 includes program modules 102 for performing a variety of different functions. The program modules are hardware-based, software-based, or include a combination of hardware and software. Each program module uses computing hardware and/or software to perform specified functions, including those described herein below.

System 101 may include an intake module 104 that is configured to access a frame of a video stream (e.g., a current frame for which to determine hand pose information) that depicts a hand. The frame may be input to intake module 104 in any suitable form including as an isolated image (raw or pre-processed) and/or as a video stream from which intake module 104 extracts the frame. By way of example, intake module 104 may receive a frame 152 of a video stream 150. As pictured, frame 152 may be the latest frame of a video stream being received (and, in some examples, generated) in real-time. Additionally or alternatively, systems described herein may sequentially analyze a pre-existing video (e.g., from a file and/or database) for hand pose information and frame 152 may represent the current frame being analyzed, even if frame 152 is not the latest available frame in video stream 150.

System 101 may also include a retrieval module 106 that identifies a previous frame of the video stream that depicts the hand at an earlier point in time. For example, retrieval module 106 may access the frame of the video stream immediately prior to the frame accessed by intake module 104 (e.g., retrieval module 106 may access the second most recent frame of the video stream). The previous frame accessed by retrieval module 106 may be input to retrieval module 106 in any suitable form including as an isolated image (raw or pre-processed) and/or as a video stream from which retrieval module 106 extracts the frame. In some examples, retrieval module 106 may retrieve the frame from a cache and/or buffer, as the frame may have been previously extracted and/or accessed by intake module 104 in a previous iteration of analysis (e.g., when the previous frame, rather than the current frame, was being analyzed for hand pose information as the then-current frame). By way of example, retrieval module 106 may receive a frame 154 of a video stream 150. As pictured, frame 154 may be the second-to-latest frame of a video stream being received (and, in some examples, generated) in real-time. Additionally or alternatively, systems described herein may sequentially analyze a pre-existing video (e.g., from a file and/or database) for hand pose information and frame 154 may represent the frame previous to the current frame being analyzed (and, e.g., the frame that was most recently analyzed for hand pose information).

System 101 may additionally include an analysis module 108 that analyzes the present frame and the previous frame together to determine whether the hand remained substantially rigid between the present and previous frames. Thus, for example, intake module 104 and retrieval module 106 may provide the present and previous frames (e.g., frames 152 and 154), respectively, to analysis module 108. In some examples, the present and previous frames may be transformed, normalized, and/or otherwise pre-processed before being provided to analysis module 108 and/or by analysis module 108 itself. As will be explained in greater detail below, in some examples analysis module 108 may use a machine learning classifier to analyze the present and previous frames.

System 101 may further include a pose module 110 that estimates a pose of the hand (e.g., describes the hand in terms of three-dimensional spatial information) using a computation that treats the hand as rigid. Pose module 110 may select the computation that treats the hand as rigid instead of selecting, e.g., an alternate available computation that does not treat the hand as rigid (and is, e.g., computationally more expensive) based on results from analysis module 108 indicating that the hand was rigid between frames 152 and 154. Pose module 110 may thereby generate an estimated pose 156 of the hand as depicted in frame 152.

Figure 2:
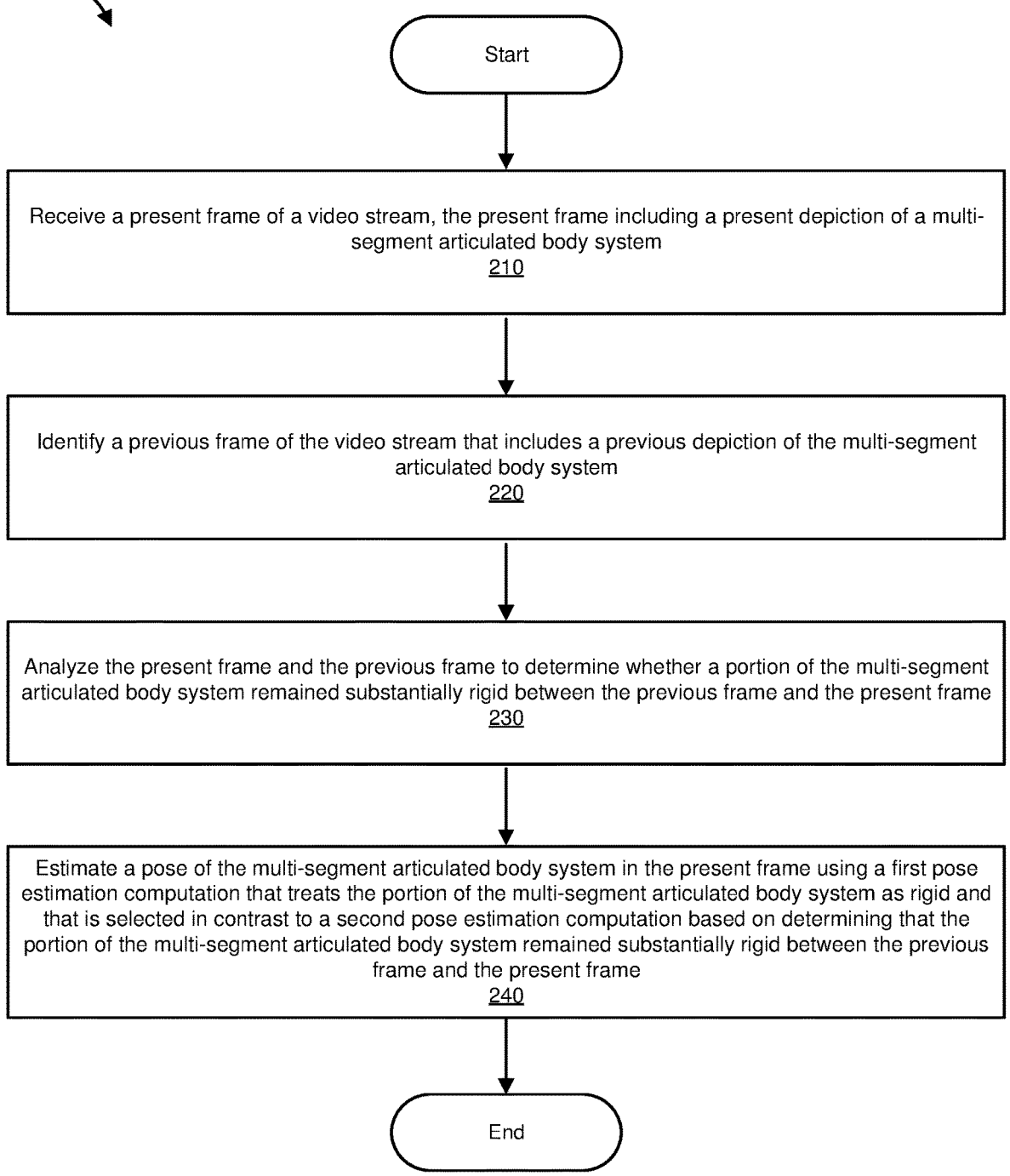
FIG. 2 is a flow diagram of an exemplary method for hand pose estimation from video.

FIG. 2 is a flow diagram of an exemplary computer-implemented method 200 for estimating hand poses from video. The steps shown in FIG. 2 may be performed by any suitable computer-executable code and/or computing system, including the system(s) illustrated in FIGS. 1 and 3-5. In one example, each of the steps shown in FIG. 2 may represent an algorithm whose structure includes and/or is represented by multiple sub-steps, examples of which will be provided in greater detail below.

As illustrated in FIG. 2, at step 210, method 200 may include receiving a present frame of a video stream, the present frame including a present depiction of a multi-segment articulated body system. As used herein, the term "video stream" may refer to any time-sequenced collection of images. In some examples, the video stream be processed by the systems and methods described herein in real-time—e.g., as it is captured (e.g., by a camera used in an augmented reality system) and/or received via a transmission.

Additionally, as used herein, the term "multi-segment articulated body system" may refer to any portion of a body (e.g., a human body) that can be modeled in terms of one or more joints and one or more substantially rigid segments connected by the joints. For example, the human musculoskeletal system can be modeled as a multi-segment articulated body system, with joints forming the interfaces between the different segments and joint angles defining the spatial relationships between connected segments in the model. Constraints on the movement at the joints may be governed by the type of joint connecting the segments and the biological structures (e.g., muscles, tendons, ligaments, etc.) that restrict the range of movement at the joint. Thus, for example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion. One example of a multi-segment articulated body system may include a person's arm (including, e.g., the hand at the end of the arm). Other examples of a multi-segment articulated body system may include the person's forearm (including, e.g., the hand); only the hand; or the person's entire body. Thus, as may be appreciated, a portion of a multi-segment articulated body system may itself represent a multi-segment articulated body system.

As will be discussed in greater detail below, in some cases a multi-segment articulated body system may remain substantially rigid over time; that is, the relative positions and angles of the segments and/or joints of the multi-segment articulated body system may remain substantially the same over time—even when the multi-segment articulated body system as a whole moves (e.g., via translation and/or rotation) through space over time (e.g., due to extension, flexion, and/or rotation at one or more joints to which the multi-segment articulated body system is ultimately anchored).

Receiving the present frame may happen in any of a variety of contexts. For example, systems described herein may receive a video stream and extract the present frame from the video stream (e.g., by extracting the latest frame in the video stream and/or by extracting a current frame for analysis in the video stream). Additionally or alternatively, systems described herein may receive the present frame having already been extracted from the video stream. In some examples, the video stream may originate from a camera used in an augmented reality system (e.g., that tracks movements of the user of the augmented reality system). In other examples, the video stream may originate from a camera used as a user interface system (e.g., for gesture-based input to a computing system). In further examples, the video stream may originate from a video chat session. In addition to the foregoing, various other types of applications may provide the video stream in real time. In some examples, the video stream may come from a stored file (e.g., not in real-time), and the systems described herein may analyze the video from the stored file to determine poses and/or gestures outside of real time.

In some examples, receiving the present frame of the video stream may entail receiving a pre-processed frame (e.g., normalized to a preconfigured size, contrast level, etc.). In other examples, receiving the present frame of the video stream may entail receiving a raw frame from the video stream. In these examples, the systems described herein may pre-process and/or normalize the present frame. For example, the frame may be cropped to the body system of interest (e.g., a hand). Additionally or alternatively, the frame may be resized to a predetermined resolution (e.g., 128×128). As will be described in greater detail below, systems described herein may use one or more machine learning models to analyze the frames discussed herein. Accordingly, the frame may be pre-processed and normalized to match the format of images used as training data for the machine learning models.

As mentioned earlier, the present frame may include a present depiction of a multi-segment articulated body system. As will be discussed in greater detail below, the systems described herein may determine (e.g., by estimation) a pose of the multi-segment articulated body system. The pose may include spatial information such as the position and/or orientation of one or more of the joints and/or segments of the multi-segment articulated body system. The spatial information may be absolute (within a frame of reference—e.g., mapping positions and/or orientations to the environment shown in the video stream) and/or relative (e.g., describing positions and orientations relative to another part of the body to which the multi-segment articulated body system is attached).

Method 200, at step 220, next includes identifying a previous frame of the video stream that includes a previous depiction of the multi-segment articulated body system. In some examples, the previous frame may be the frame in the video stream that is immediately previous to the present frame received at step 210. In some examples, the previous frame may be a recent (but not immediately previous) frame—e.g., two, three, or four frames prior. In some examples, the previous frame may be a composite of one or more previous frames.

Identifying the previous frame may happen in a variety of contexts. For example, systems described herein may receive the video stream and extract the previous frame from the video stream. Additionally or alternatively, these systems may identify the previous frame having already been extracted from the video stream. In some examples, systems described herein may iterate through a video stream, frame-by-frame, to determine pose information in each frame. In these examples, the previous frame may have previously been received as the then-present frame. Thus, these systems may have cached, buffered, and/or otherwise saved the then-present frame and, at step 220, may identify it as the previous frame to the now-present frame.

In some examples, identifying the previous frame of the video stream may entail identifying a pre-processed frame. In some examples, the systems described herein may pre-process and/or normalize the previous frame. For example, these systems may pre-process the previous frame to match the format of images used as training data for the machine learning models discussed earlier. Additionally or alternatively, these systems may pre-process the present and previous frames to match each other's formats and attributes.

In various examples, the previous frame may represent an image captured a fraction of a second before the present frame. Accordingly, the previous depiction of the multi-segment articulated body system provided in the previous frame may represent a relatively small difference from the present depiction of the multi-segment articulated body system in the present frame. As will be explained in greater detail below, systems described herein may classify this difference to determine whether the difference nevertheless demonstrates rigidity across the previous and present frames.

Method 200, at step 230, next includes analyzing the present frame and the previous frame to determine whether a portion of the multi-segment articulated body system remained substantially rigid between the previous frame and the present frame. The systems described herein may analyze the present frame and the previous frame to determine whether the portion of the multi-segment articulated body system remained substantially rigid in any suitable manner. In some examples, these systems may use a machine learning classifier that is trained to classify pairs of body system images (e.g., temporally sequenced hand images) as rigid or not rigid. An example of a classifier to detect hand rigidity will be discussed in greater detail below in connection with FIG. 4.

In some examples, the portion of the multi-segment articulated body system may include a hand (where the multi-segment articulated body system may include, e.g., the forearm with the hand). In some examples, the "portion" of the multi-segment articulated body system may refer to the whole of the multi-segment articulated body system present in the present and previous frames discussed earlier. Thus, for example, a hand alone may appear in the frames and the systems described herein may determine whether the hand remained rigid between the frames.

Herein, a multi-segment articulated body system may be termed "substantially" rigid where changes to the internal articulation of the system are minimal and/or negligible according to a pre-defined criterion. What degree of changes to or internal movement within a body system is negligible may vary depending on the application to which the systems described herein are applied. Any suitable factors, including user perception, motor control, feedback regarding gestural intention, etc., may contribute to determining substantial or effective rigidity. Accordingly, the systems described herein may be configured with a difference threshold, below which differences between two poses (e.g., two hand poses in close temporal sequence) are considered negligible and the two poses are considered to represent substantial rigidity of the body system. As mentioned earlier, in some examples a machine learning classifier may determine rigidity between two images of temporally sequential poses. Accordingly, in some examples, the threshold for substantial rigidity may be determined via the training data provided (e.g., image pairs that meet the threshold may be labeled as "rigid" and those that do not may be labeled as "not rigid"). By way of example, the threshold for substantial rigidity may be set at 0.1 mm, where average joint location deviations greater than 0.1 mm disqualify temporally sequential poses as rigid.

By way of an example for defining rigidity, systems described herein may first perform a rigid motion computation between two hand poses and then, with the rigid motion between the two poses being solved, calculate the average distance between the joints of one hand pose from the respective joints of the other hand pose to determine the average error. Table 1 shows an example rigid motion computation.

TABLE 1

Example Rigid Motion Computation

Input: 3D position of n hand joints captured by two consecutive frames
Result: Rotation & translation matrices: R, t TABLE 1-continued Example Rigid Motion Computation 1. $\overline{p}_t = \frac{1}{n}\sum_{i=1}^{n} p_{t,i}, \overline{p}_{t+1} = \frac{1}{n}\sum_{i=1}^{n} q_{t,i};$ 2. $\tilde{p}_{t,i} := p_{t,i} - \overline{p}_t, \tilde{p}_{t+1,i} := p_{t+1,i} - \overline{p}_{t+1}, i = 1, 2, \ldots, n;$ 3. $\tilde{\psi}_t = [\tilde{p}_{t,1}, \tilde{p}_{t,2}, \ldots, \tilde{p}_{t,n}], \tilde{\psi}_t = [\tilde{p}_{t,1}, \tilde{p}_{t,2}, \ldots, \tilde{p}_{t,n}];$ 4. $U\sum V^T = svd(\tilde{\psi}_t \tilde{\psi}_{t+1}^T);$ 5. $R = V \begin{bmatrix} 1 & & & \\ & \ddots & & \\ & & 1 & \\ & & & \det(VU^T) \end{bmatrix} U^T;$ 6. $t = \overline{p}_{t+1} - R\overline{p}_t$ where the frame with hand pose at timestamp t denoted as $f_t$, and the corresponding hand joint positions are denoted as $\psi_t$. The notation of keypoint positions may be decomposed to the 3D locations of n keypoints ($p_{t,1}, p_{t,2}, \ldots, p_{t,n}$). With the rigid motion being solved, systems described herein may calculate the averaged distance between the transformed hand joints from the previous frame and the hand joints of the present frame as shown in Equation (2) below:

$$E = \frac{1}{n} sqrt\left(\sum_{i=1}^{n} \|(Rp_{t,i} + t) - p_{t+1,i}\|_2^2\right) \quad (2)$$

As mentioned earlier, computations for analyzing the previous frame and the present frame to determine the presence or absence of substantial rigidity may be relatively inexpensive (e.g., in terms of CPU cycles, memory usage, computation time, etc.) in comparison with computations used to estimate a pose directly from an image. Therefore, as will be discussed in greater detail below, the computational cost of checking for rigidity may be small relative to the savings possible due to sometimes avoiding estimating a pose directly from an image.

Method 200, at step 240, next includes estimating a pose of the multi-segment articulated body system in the present frame using a first pose estimation computation that treats the portion of the multi-segment articulated body system as rigid and that is selected in contrast to a second pose estimation computation based on determining that the portion of the multi-segment articulated body system remained substantially rigid between the previous frame and the present frame.

The first pose estimation computation and the second pose estimation computation may include any suitable computer-executed computations. For example, the first pose estimation computation and/or the second pose estimation computation may include applying machine learning models. In some examples, the first pose estimation computation may consume fewer computing resources than the second pose estimation computation. For example, the first pose estimation computation may consume fewer CPU cycles, less memory, and/or take less time. In some examples, the first pose estimation computation may be simpler than the second pose computation at least because the second pose estimation computation operates with more degrees of freedom (e.g., joint angle changes) than does the first pose estimation computation. In some examples, the first pose estimation computation operates with simpler and/or smaller input. For example, the first pose estimation computation may operate based on previous hand pose information (e.g., describing spatial information of joints) whereas the second pose estimation computation may analyze the present frame to estimate the pose of the depicted body system (e.g., a hand).

As will be described in greater detail below, the systems described herein may select between at least two pose estimation computations (e.g., the first post estimation computation and the second pose estimation computation), the logic of the selection being driven at least in part by a determination of whether the multi-segment articulated body system depicted in the previous and present frames was rigid across the previous and present frames.

Figure 3:
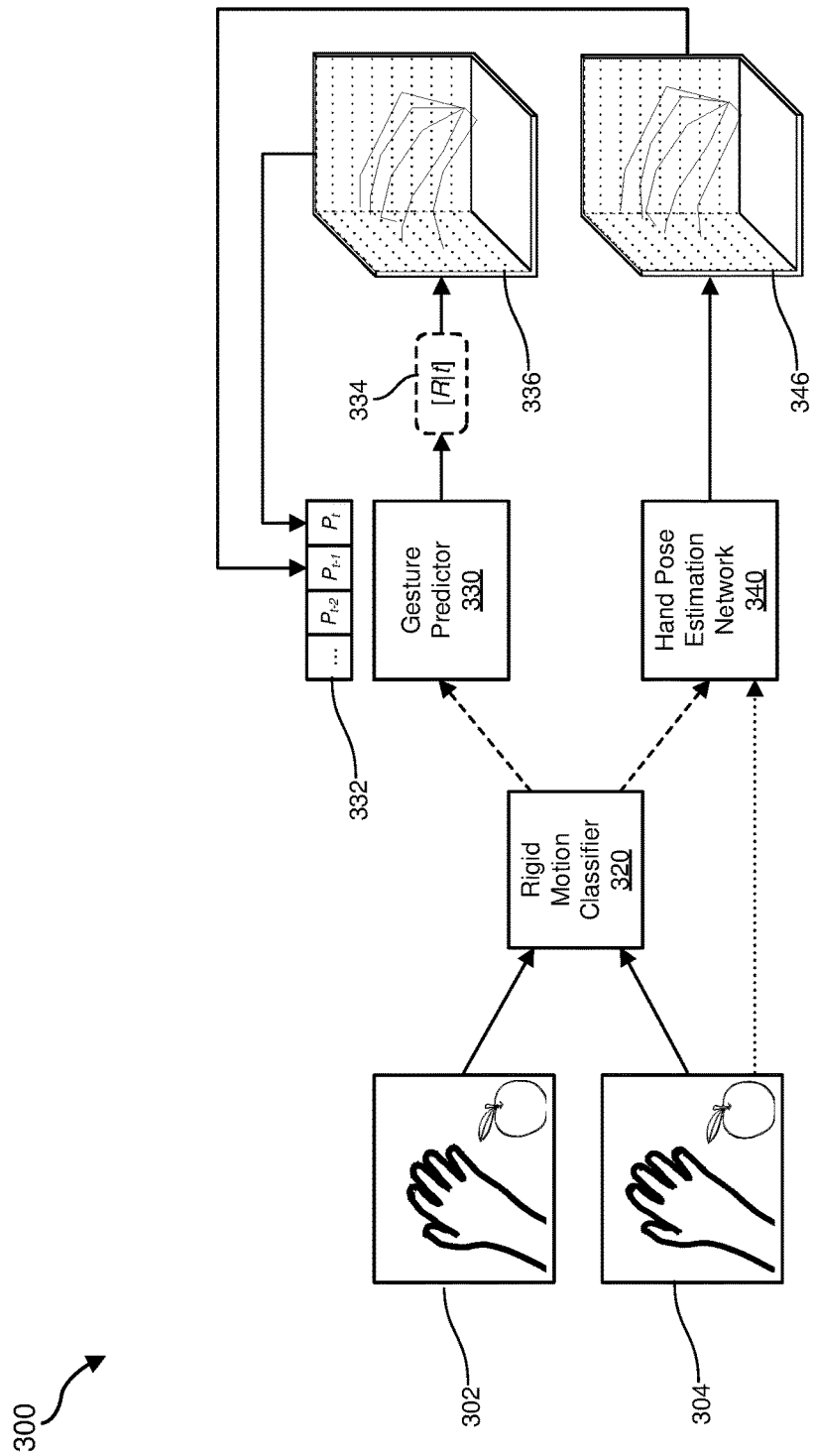
FIG. 3 is a diagram of an exemplary system for hand pose estimation from video.

FIG. 3 illustrates an example system 300 for efficiently estimating hand poses from video. As shown in FIG. 3, system 300 may include a rigid motion classifier 320, a gesture predictor 330, and a hand pose estimation network 340. Hand pose estimation network 340 may represent any module, process, and/or computation for estimating a hand pose from an image. In some examples, hand pose estimation network 340 may represent the "second pose estimation computation" discussed herein. For example, hand pose estimation network 340 may represent a machine learning model that takes an image of a hand as input and produces a hand pose (e.g., spatial information describing the position and/or orientation of one or more joints and/or segments of the hand) as output. Such a machine learning model may be trained to estimate the hand pose based on a training corpus of hand images that demonstrate hands in various possible configurations and that collectively demonstrates the freedom of movement provided by the various joints of the human hand. The machine learning model may also be complex enough (including, e.g., involving enough computations) to reliably and accurately estimate hand poses from images.

Rigid motion classifier 320 may represent any module, process, and/or computation for determining whether a hand remained substantially rigid between two temporally sequenced images. For example, rigid motion classifier 320 may represent a machine learning classifier that takes two temporally sequenced images as input and produces a binary classification (indicating substantial rigidity or not) as output.

Gesture predictor 330 may represent any module, process, and/or computation for estimating a hand pose. In some examples, gesture predictor 330 may represent the "first pose estimation computation" discussed herein. In some examples, gesture predictor 330 may not estimate a hand pose from an image, but rather estimate the hand pose from previous hand poses. For example, gesture predictor 330 may use a buffer 332 of previous hand poses (e.g., a sequence of three most recently determined hand poses) to estimate the current hand pose. (While the hand pose from the most recently determined frame to the present frame may be rigid, in some examples the hand pose across the three most recently determined hand poses may not be rigid; nevertheless, the non-rigid hand poses may serve as conditions and provide sequential hand motion cues.) Furthermore, gesture predictor 330 may operate on the assumption of rigidity of the hand between the most recently determined hand pose and the current hand pose (based, e.g., on the classification from rigid motion classifier 320). Thus, for example, gesture predictor may represent a machine learning classifier trained on temporally sequenced hand pose information as input and producing rigid body movement (e.g., translation and/or rotation of the rigid hand as a whole) as output.

In some examples, the systems described herein (such as system 300) may iteratively estimate a hand pose for each frame of a video stream (e.g., in real time, as each frame is generated and/or made available). As may be appreciated, although hand pose estimation network 340 could estimate the hand pose for each individual frame, this may be a computationally expensive task. However, gesture predictor 330 may estimate hand poses much more efficiently (when, e.g., rigidity can be assumed). In addition, the relative computational expense of rigid motion classifier 320 may be negligible compared to the computational expense of hand pose estimation network 340 as well as to the average computational savings of substituting the operation of hand pose estimation network 340 with the operation of gesture predictor 330 (accounting for, e.g., the expected frequency with which a hand may be expected to be observed rigid across two sequential frames). Accordingly, by prepending rigid motion classifier 320 with gesture predictor 330 to an independently functional hand pose estimation network 340, the systems described herein may improve system 300 in comparison with a version of system 300 that uses only hand pose estimation network 340 for hand pose estimation.

By way of example of the operation of system 300, FIG. 3 shows frames 302 and 304. In some examples, frames 302 and 304 may be sequential frames in a video stream. Frame 302 may be the most recent frame in the video stream and frame 304 may be the second most recent frame in the video stream. In some examples, hand pose information from frame 304 may have previously been estimated by system 300 (when frame 304 was the most recent frame in the video stream). For example, frame 304 may have been provided to hand pose estimation network 340, which may have produced hand pose information 346 to describe the hand pose in frame 304. In some examples, before being provided to hand pose estimation network 340, frame 304 and the frame previous to frame 304 in the video stream may have been provided to rigid motion classifier 320, which may have determined that there was not substantial rigidity in the hand across frame 304 and the frame previous to frame 304.

To begin the process of estimating hand pose information for frame 302, rigid motion classifier 320 may take frames 302 and 304 as input. Rigid motion classifier may determine rigidity in the hand pose between frames 302 and 304. Accordingly, rigid motion classifier may select gesture predictor 330 instead of hand pose estimation network 340 for estimating the hand pose of frame 302. Gesture predictor may take the previously estimated hand pose information from previous frames (e.g., frame 304 and the two frames prior to frame 304 in the video stream) as input (using, e.g., an input sequence buffer 332) and produce spatial transformation information that describes the translation and rotation to apply to the rigid hand pose of frame 304 (e.g., hand pose 346) to predict the hand pose of frame 302. At 334, system 300 may apply the spatial transformation information to hand pose 346 to produce estimated hand pose 336 for frame 302. Hand pose 336 may then be added to buffer 332 for use in future iterations (i.e., to enable gesture predictor 330 to predict the hand pose of a future frame).

Figure 4:
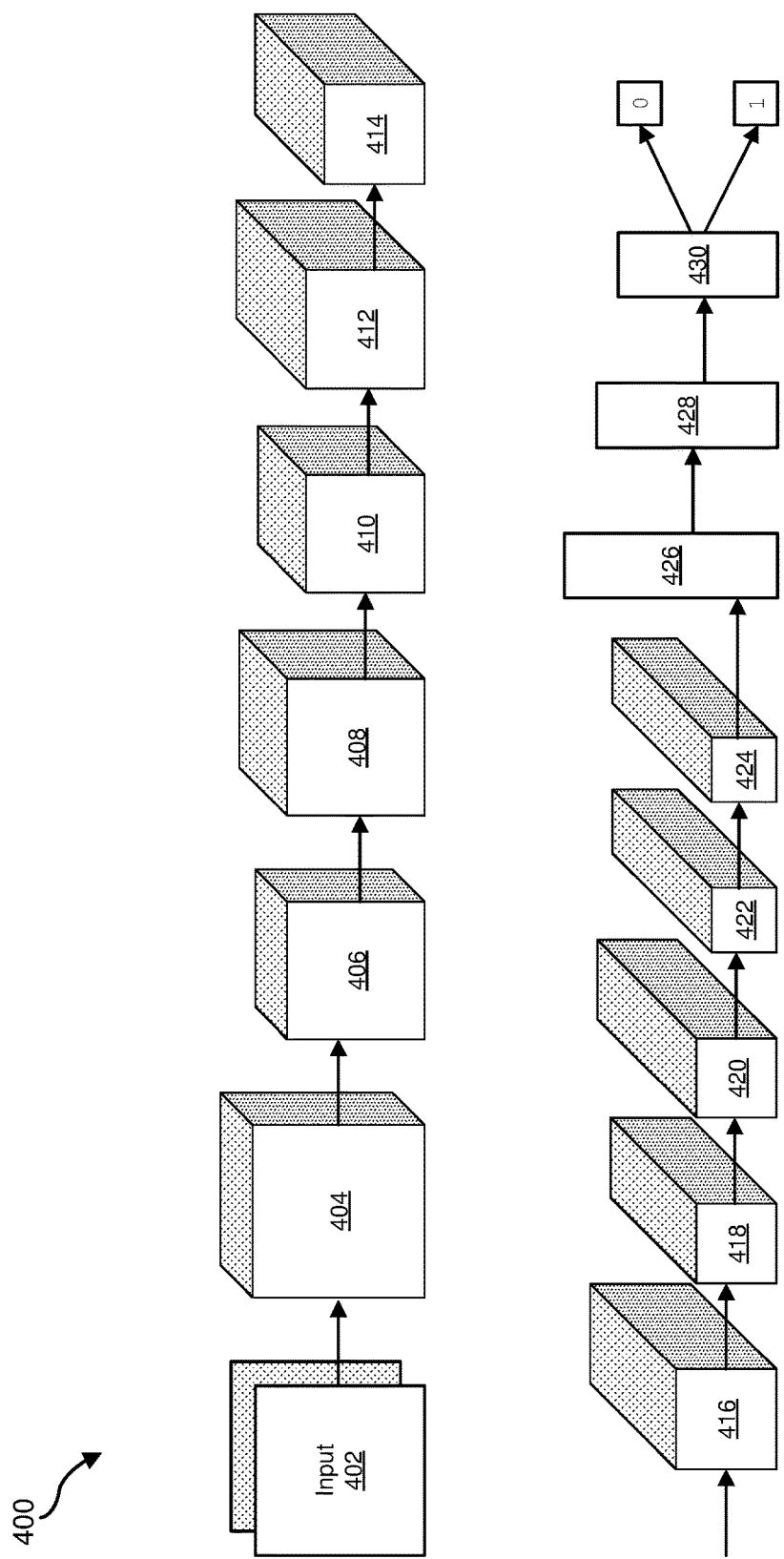
FIG. 4 is a diagram of an exemplary rigid motion classifier.

FIG. 4 illustrates an example rigid motion classifier 400. As shown in FIG. 4, rigid motion classifier 400 may take an input 402. In one example, input 402 may be two 128×128 RGB images concatenated (e.g., cropped hands from two sequential frames). Input 402 may be to a convolutional layer 404. In one example, convolutional layer 404 may be a 3×3 convolutional layer with 32 filters. Intermediate processing module 406 may then perform one or more processing steps to improve the performance of classifier 400. For example, intermediate processing 406 may include one or more normalization, activation, and/or pooling steps. As an example, intermediate processing module 406 may perform a batch normalization procedure, apply rectified linear unit activation function, and a maximum pooling operation (in any suitable order including, e.g., in that order) on the output from convolutional layer 404. Convolutional layers 408, 412, 416, and 420 may be followed by similar intermediate processing modules 410, 414, 418, and 422, which may perform the same and/or similar steps. Successive convolutional layers may include the same or increasing numbers of filters. For example, convolutional layer 408 may be a 3×3 convolutional layer with 64 filters. Convolutional layer 412 may be a 3×3 convolutional layer with 128 filters. Convolutional layer 416 may be a 3×3 convolutional layer with 256 filters. Convolutional layer 420 may be a 3×3 convolutional layer with 256 filters. Following the operation of intermediate processing module 422, a processing module 424 may perform an average pooling operation. A processing module 426 may perform a flattening function. A fully connected layer 426 of size 1024 may take the flattened data as input. A fully connected layer 428 of size 128 may take the output of fully connected layer 426 as input. Classifier 300 may then output 0 or 1, representing the classification of rigidity (absent or present).

Figure 5:
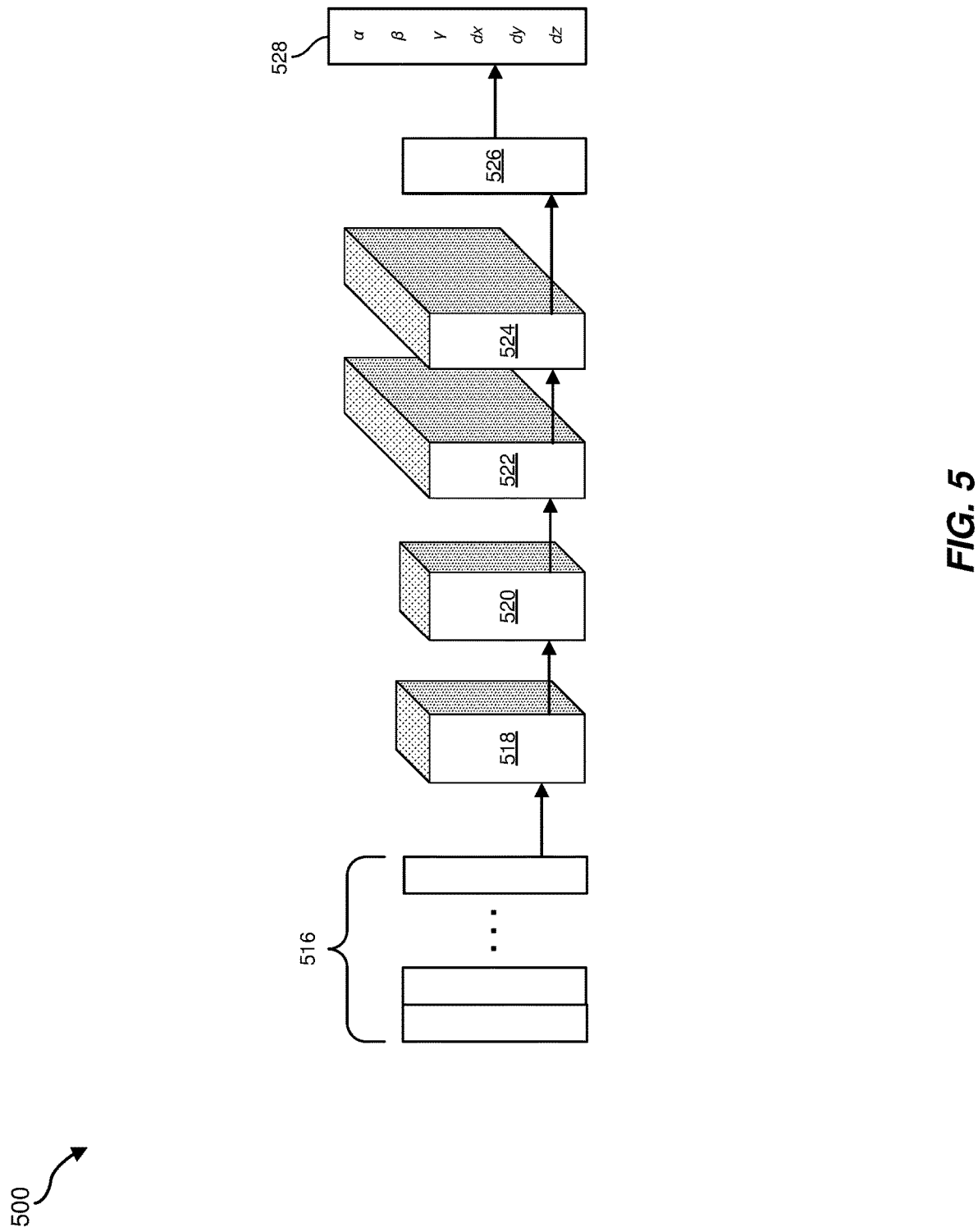
FIG. 5 is a diagram of an exemplary gesture predictor.

FIG. 5 illustrates an example system 500 for estimating hand poses. In some examples, system 500 may provide an example of gesture predictor 330 of FIG. 3. As shown in FIG. 5, an input 516 may be provided to system 500. In some examples, input 516 may represent the joint positions of a hand (or another suitable multi-segment articulated body system) in three-dimensional space. Input 516 may be provided to a convolutional layer 518. In one example, convolutional filter 518 may be a 6×2 convolutional layer with 64 filters. An intermediate processing module 520 may then perform one or more intermediate processing steps. For example, intermediate processing layer 520 may perform a batch normalization and then apply a rectified linear unit activation function. A convolutional layer 522 may be a 1×2 convolutional layer with 128 filters. An intermediate processing module 524 may then perform a batch normalization and then apply a rectified linear unit activation function. A processing module 526 may then flatten the data and provide it as input to two fully connected network layers (e.g., the first being of size 128). The output of the fully connected network may produce output 528. Output 528 may include transformation information that predicts the transformation of a rigid hand. Output 528 may include rotation and transformation information in three-dimensional space.

During training of system 500, the ground truth next-frame joint positions may be provided to the network. In each forward pass, the rotation angles from three dimensions and the 3D translations of the rigid body may be inferred, which may define the rotation and translation matrices. The predicted joint locations at time t+1 may be acquired by projecting the joint locations at timestamp t as shown in Equation (3) below:

$$\hat{p}_{t+1} = \hat{R} p_t + \hat{t} \quad (3)$$

The loss may be defined as the 3D Euclidean distance between the predicted next-frame keypoint positions and the ground truth to regularize the prediction. During training, the objective function may regularize the network to predict for rotation and translation parameters of the hand pose from the present to the next frame. An example of the computation of the loss is shown in Equation (4) below:

$$L = d(\hat{\psi}_{t+1}, \psi_{t+1}) = \text{sqrt}\left(\Sigma^n_{i=1} \|\hat{p}_{t+1,i} - p_{t+1,i}\|^2\right) \quad (4)$$

where d(·) is the 3D distance between the predicted hand joint locations and the ground truth.

Figure 6:
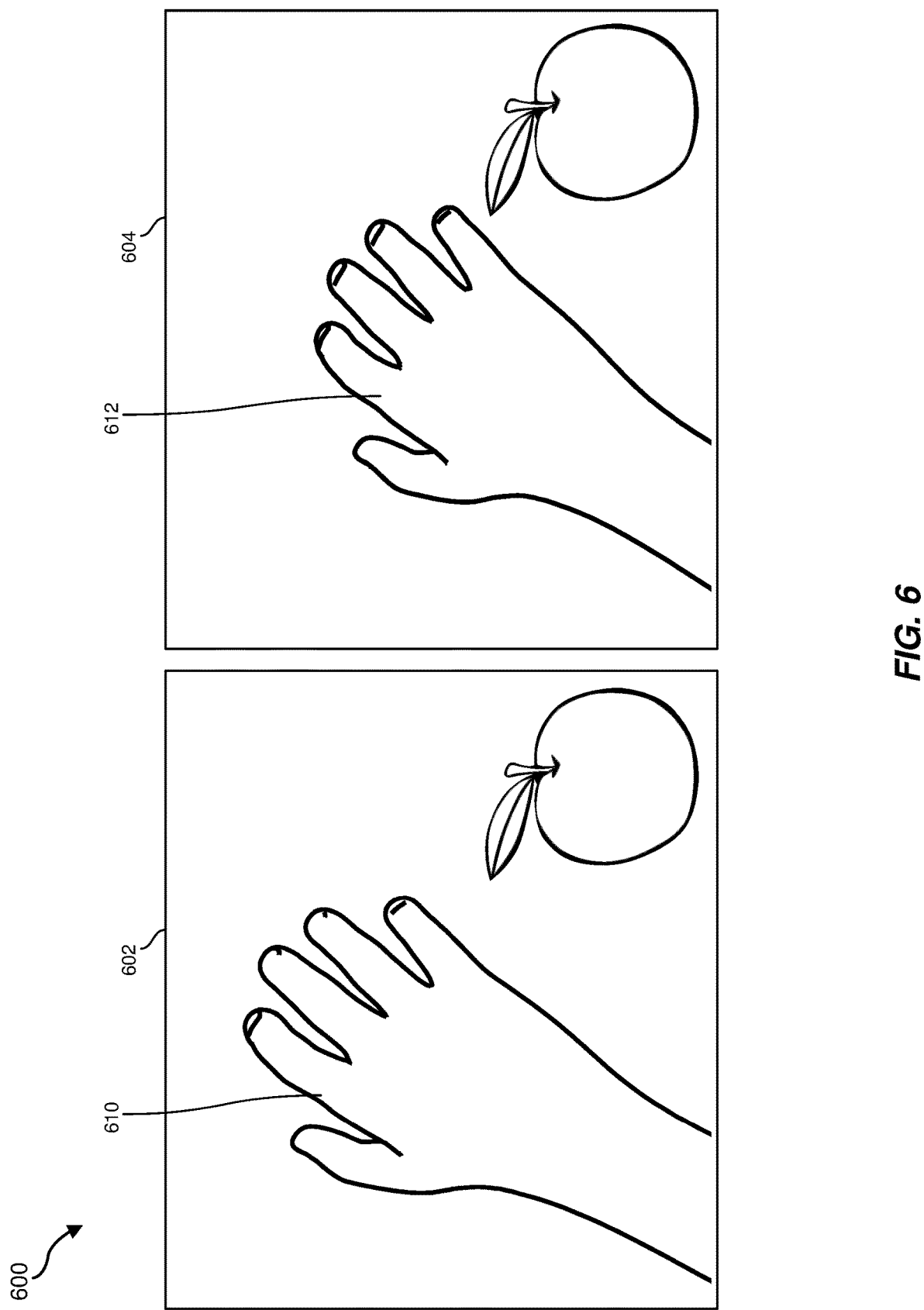
FIG. 6 is an illustration of an exemplary pair of sequential video frames showing a rigid hand moving.

FIG. 6 illustrates an example sequence of frames that demonstrates hand poses. Frame 602 may show a hand pose 610. The next frame, frame 604, may show a hand pose 612. The hand may be substantially rigid between frames 602 and 604, such that, e.g., the relative joint positions of the hand did not change, even though the hand as a whole moved a small distance within the frame. For example, the change in the position of the hand may be described as a translation through three-dimensional space. Accordingly, using FIG. 3 as an example, rigid motion classifier 320 may determine that the motion of the hand from frames 602 and 604 was the motion of a substantially rigid hand. Accordingly, rigid motion classifier 320, when taking frames 602 and 604 as input, may select gesture predictor 330 instead of hand pose estimation network 340 for estimating the hand pose of frame 604.

Figure 7:
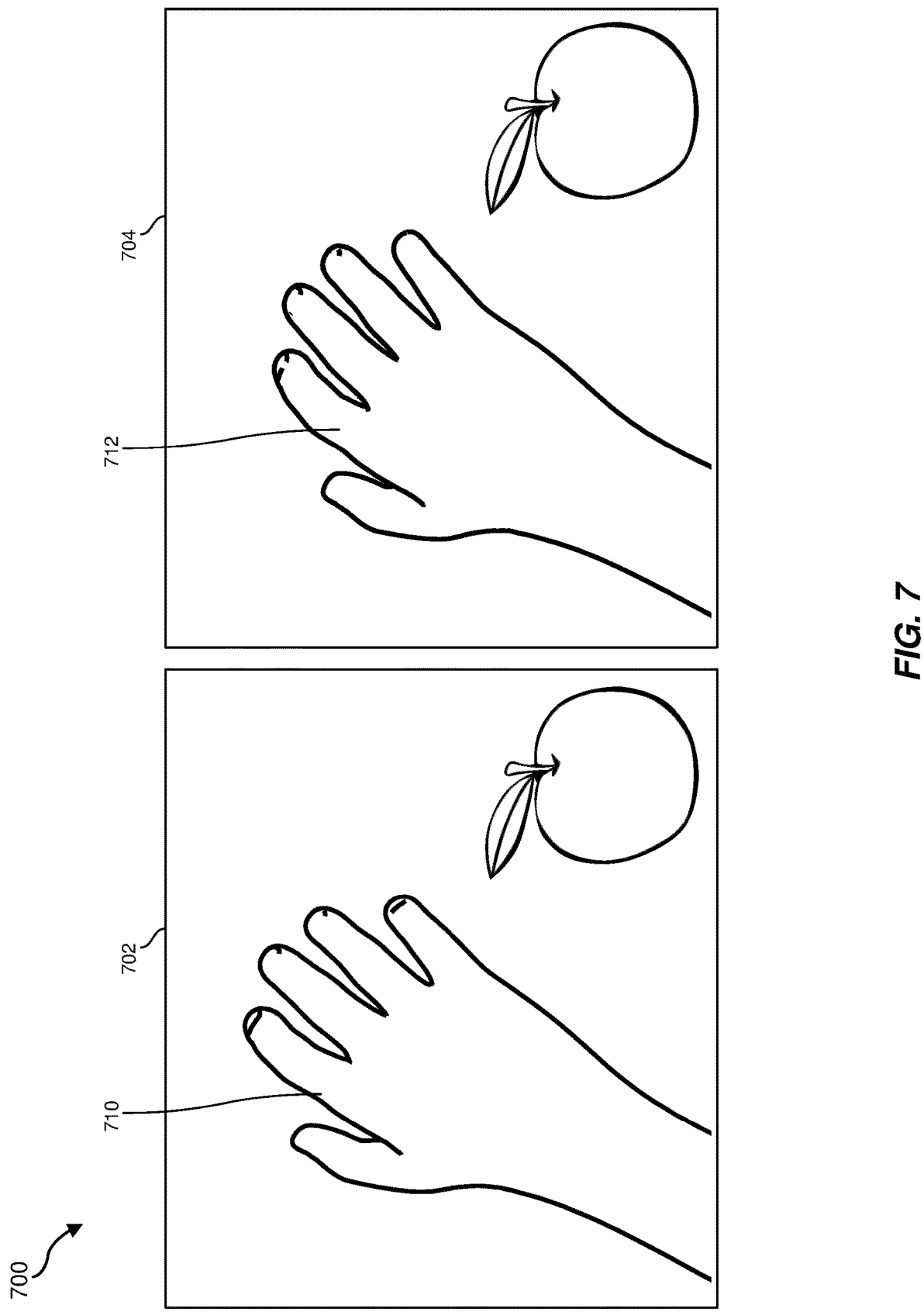
FIG. 7 is an illustration of an exemplary pair of sequential video frames showing a rigid hand rotating.

FIG. 7 illustrates an example sequence of frames that demonstrates hand poses. Frame 702 may show a hand pose 710. The next frame, frame 704, may show a hand pose 712. The hand may be substantially rigid between frames 702 and 704, such that, e.g., the relative joint positions of the hand did not change, even though the hand as a whole moved a small amount within the frame. For example, the change in the position of the hand may be described as a rotation through three-dimensional space. Accordingly, using FIG. 3 as an example, rigid motion classifier 320 may determine that the motion of the hand from frames 702 and 704 was the motion of a substantially rigid hand. Accordingly, rigid motion classifier 320, when taking frames 702 and 704 as input, may select gesture predictor 330 instead of hand pose estimation network 340 for estimating the hand pose of frame 704.

Figure 8:
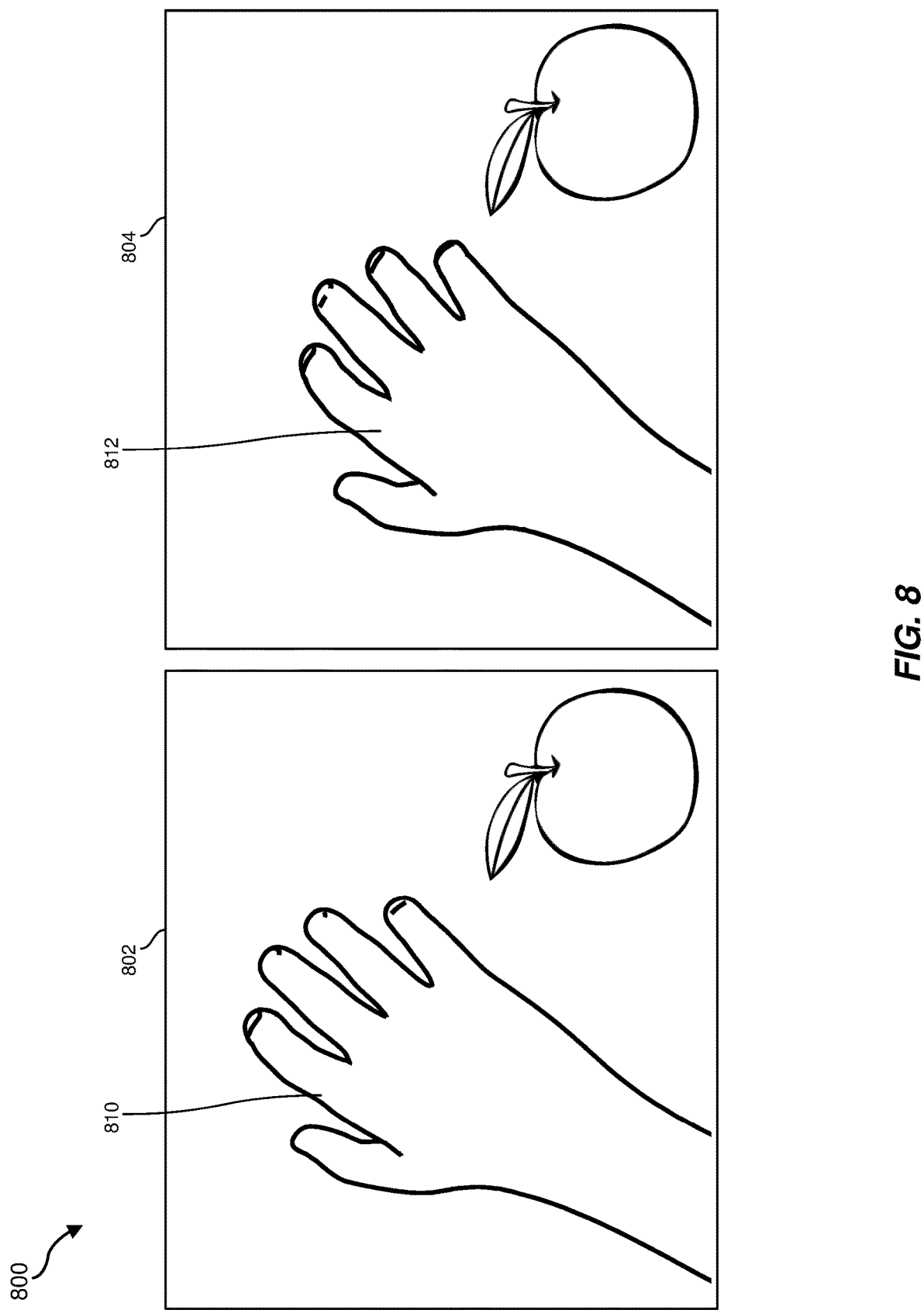
FIG. 8 is an illustration of an exemplary pair of sequential video frames showing a hand articulating to a different pose.

FIG. 8 illustrates an example sequence of frames that demonstrates hand poses. Frame 802 may show a hand pose 810. The next frame, frame 804, may show a hand pose 812. The hand may not be substantially rigid between frames 802 and 804—that is, e.g., the relative joint positions of the hand changed. For example, hand pose 812 may show the hand a small amount more closed than in hand pose 810. Accordingly, using FIG. 3 as an example, rigid motion classifier 320 may determine that the motion of the hand from frames 802 to 804 was not the motion of a substantially rigid hand. Accordingly, rigid motion classifier 320, when taking frames 802 and 804 as input, may select hand pose estimation network 340 instead of gesture predictor 330 for estimating the hand pose of frame 804.

As explained above, a rigid hand motion classifier and a gesture predictor may augment a hand pose estimation network (that, e.g., takes monocular RGB images as input). The hand pose prediction is an optimization problem constrained by the parameterization of 3D rigid motion, because only hand patches being classified as following 3D rotations and/or translations may be predicted; otherwise, hand pose estimation may be handled by the full backend network. Compared with random hand movements embodied by stochastic and nonlinear dynamics, the constrained rigid motions have many fewer degrees of freedom, which may dramatically reduce the prediction space and make efficient and robust predictions possible. The systems and methods described herein may be versatile and applied to accelerate various types of hand pose estimation networks to provide accurate pose estimation performance with significantly less computational cost and overall faster inference speed.

Example Embodiments

Example 1: A computer-implemented method for estimating hand poses from video may include (1) receiving a present frame of a video stream, the present frame comprising a present depiction of a multi-segment articulated body system, (2) identifying a previous frame of the video stream that comprises a previous depiction of the multi-segment articulated body system, (3) analyzing the present frame and the previous frame to determine whether a portion of the multi-segment articulated body system remained substantially rigid between the previous frame and the present frame, and (4) estimating a pose of the multi-segment articulated body system in the present frame using a first pose estimation computation that treats the portion of the multi-segment articulated body system as rigid and that is selected in contrast to a second pose estimation computation based on determining that the portion of the multi-segment articulated body system remained substantially rigid between the previous frame and the present frame.

Example 2: The computer-implemented method of Example 1, where the portion of the multi-segment articulated body system is a hand.

Example 3: The computer-implemented method of any of Examples 1 and 2, where estimating the pose of the multi-segment articulated body system comprises estimating a spatial configuration of the multi-segment articulated body system, the spatial configuration comprising at least one of: (1) a spatial position of one or more segments of the multi-segment articulated body system, (2) a spatial position of one or more joints connecting one or more segments of the multi-segment articulated body system, or (3) an angle between one or more joint-connected segments of the multi-segment articulated body system.

Example 4: The computer-implemented method of any of Examples 1-3, also including (1) receiving a different present frame of the video stream comprising a different present depiction of the multi-segment articulated body system, (2) identifying a different previous frame of the video stream that comprises a different previous depiction of the multi-segment articulated body system, (3) analyzing the different present frame and the different previous frame to determine whether the portion of the multi-segment articulated body system remained substantially rigid between the different previous frame and the different present frame, and (4) estimating a different pose of the multi-segment articulated body system in the different present frame using the second pose estimation computation that does not treat the portion of the multi-segment articulated body system as rigid and that is selected in contrast to the first pose estimation computation based on determining that the portion of the multi-segment articulated body system did not remain substantially rigid between the different previous frame and the different present frame.

Example 5: The computer-implemented method of any of Examples 1-4, where determining that the portion of the multi-segment articulated body system remained substantially rigid includes determining at least one of (1) relative positions of segments within the portion of the multi-segment articulated body system remained unchanged, or (2) angles between segments within the portion of the multi-segmented articulated body system remained unchanged.

Example 6: The computer-implemented method of any of Examples 1-5, where determining that the portion of the multi-segment articulated body system remained substantially rigid comprises determining a change in pose of the portion of the multi-segment articulated body system can be substantially described by one or more of: (1) a translation of the portion of the multi-segment articulated body system as a whole, or (2) a rotation of the portion of the multi-segment articulated body system as a whole.

Example 7: The computer-implemented method of any of Examples 1-6, where the first pose estimation computation, when performed, consumes fewer computing resources that does the second pose estimation computation when performed.

Example 8: The computer-implemented method of any of Examples 1-7, where the first pose estimation computation produces one or more of: (1) an estimated translation of the portion of the multi-segment articulated body system as a rigid system, or (2) an estimated rotation of the portion of the multi-segment articulated body system as a rigid system.

Example 9: The computer-implemented method of any of Examples 1-8, where the first pose estimation computation takes as input information previously processed from one or more previous frames of the video stream but not information from the present frame of the video stream.

Example 10: The computer-implemented method of any of Examples 1-9, where the second pose estimation computation takes as input the present frame of the video stream.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 900 in FIG. 9) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
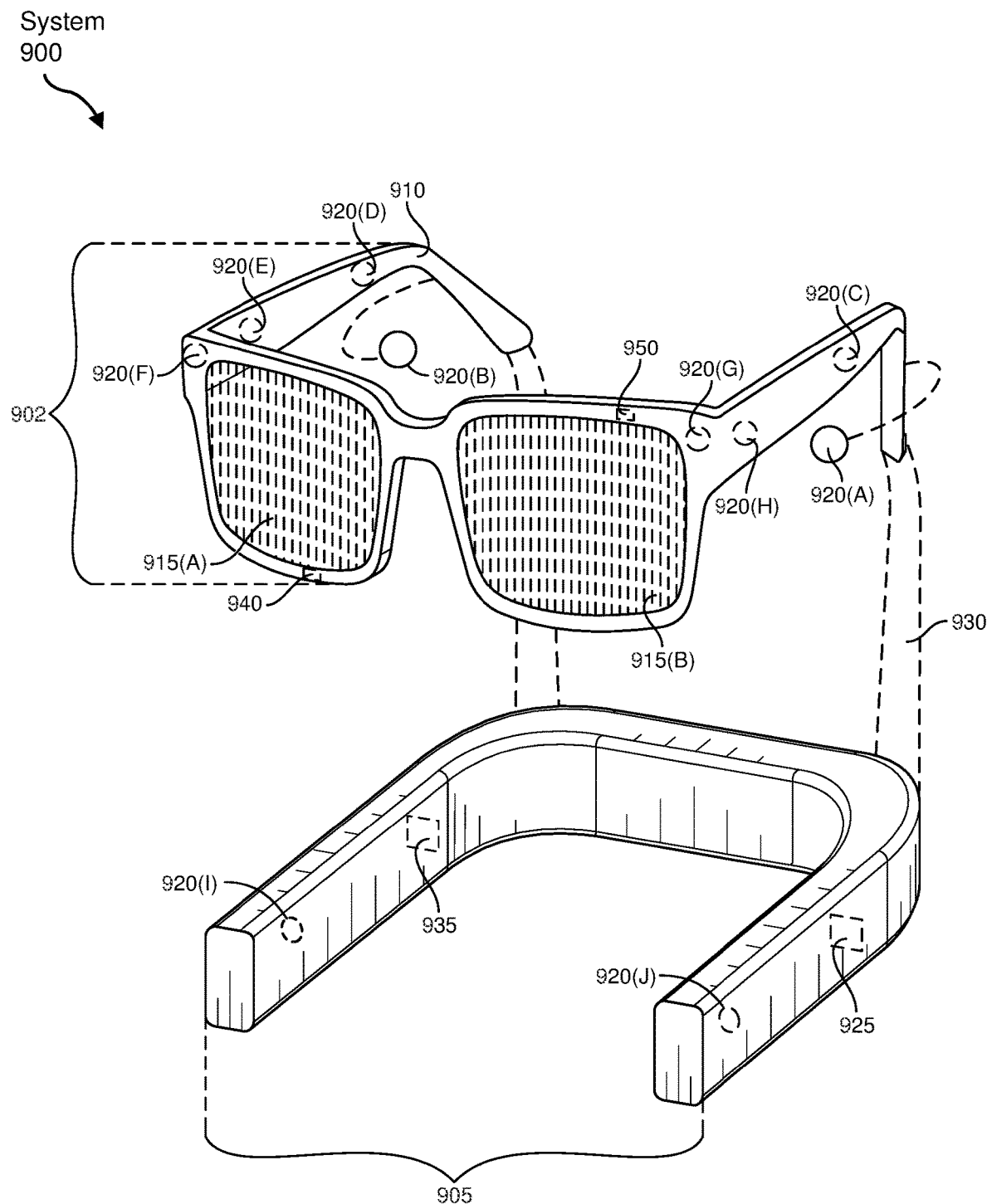
FIG. 9 is an illustration of exemplary augmented-reality glasses that may be used in connection with embodiments of this disclosure.
Figure 10:
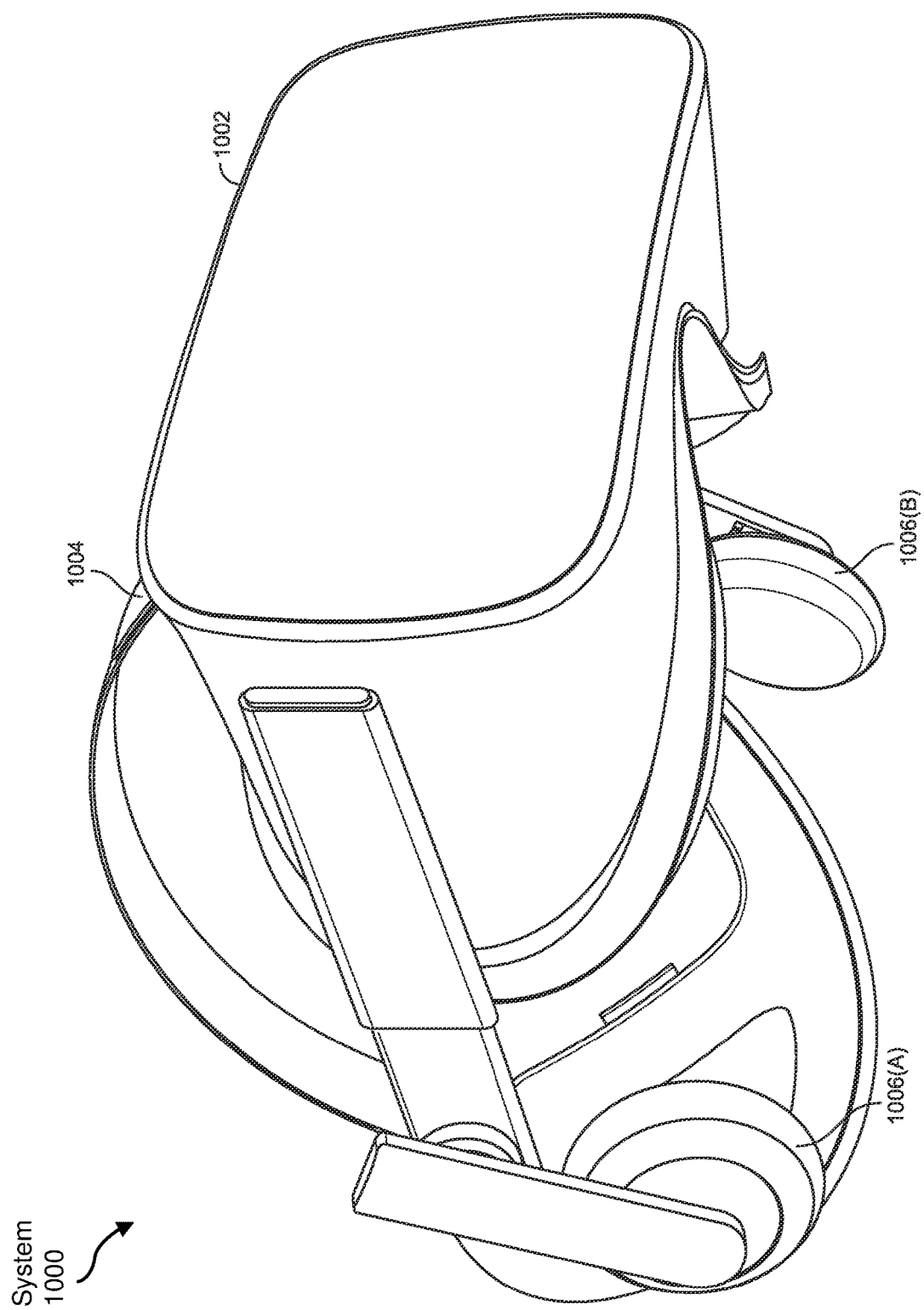
FIG. 10 is an illustration of an exemplary virtual-reality headset that may be used in connection with embodiments of this disclosure.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, augmented-reality system 900 may also include a microphone array with a plurality of acoustic transducers 920(A)-920(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 9 may include, for example, ten acoustic transducers: 920(A) and 920(B), which may be designed to be placed inside a corresponding ear of the user, acoustic transducers 920(C), 920(D), 920(E), 920(F), 920 (G), and 920(H), which may be positioned at various locations on frame 910, and/or acoustic transducers 920(1) and 920(J), which may be positioned on a corresponding neckband 905.

In some embodiments, one or more of acoustic transducers 920(A)-(J) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality device 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a BLUETOOTH connection). In still other embodiments, acoustic transducers 920(A) and 920(B) may not be used at all in conjunction with augmented-reality system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(I) and 920(J)) that are part of the microphone array (or potentially form their own microphone subarray). Neckband 905 may also include a controller 925 and a power source 935.

Acoustic transducers 920(I) and 920(J) of neckband 905 may be configured to detect sound and convert the detected sound into an electronic format (analog or digital). In the embodiment of FIG. 9, acoustic transducers 920(I) and 920(J) may be positioned on neckband 905, thereby increasing the distance between the neckband acoustic transducers 920(I) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920 (D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a video stream to be transformed, transform the video stream into hand pose estimation data, output a result of the transformation to control a user interface, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving a present frame of a video stream, the present frame comprising a present depiction of a multi-segment articulated body system;
   identifying a previous frame of the video stream that comprises a previous depiction of the multi-segment articulated body system;
   analyzing the present frame and the previous frame to determine whether a portion of the multi-segment articulated body system remained substantially rigid between the previous frame and the present frame; and
   estimating a pose of the multi-segment articulated body system in the present frame using a first pose estimation computation that treats the portion of the multi-segment articulated body system as rigid and that is selected in contrast to a second pose estimation computation based on determining that the portion of the multi-segment articulated body system remained substantially rigid between the previous frame and the present frame.

2. The computer-implemented method of claim 1, wherein the portion of the multi-segment articulated body system comprises a hand.

3. The computer-implemented method of claim 1, wherein estimating the pose of the multi-segment articulated body system comprises estimating a spatial configuration of the multi-segment articulated body system, the spatial configuration comprising at least one of:
   a spatial position of one or more segments of the multi-segment articulated body system;
   a spatial position of one or more joints connecting one or more segments of the multi-segment articulated body system; or
   an angle between one or more joint-connected segments of the multi-segment articulated body system.

4. The computer-implemented method of claim 1, further comprising:
   receiving a different present frame of the video stream comprising a different present depiction of the multi-segment articulated body system;
   identifying a different previous frame of the video stream that comprises a different previous depiction of the multi-segment articulated body system;
   analyzing the different present frame and the different previous frame to determine whether the portion of the multi-segment articulated body system remained substantially rigid between the different previous frame and the different present frame; and estimating a different pose of the multi-segment articulated body system in the different present frame using the second pose estimation computation that does not treat the portion of the multi-segment articulated body system as rigid and that is selected in contrast to the first pose estimation computation based on determining that the portion of the multi-segment articulated body system did not remain substantially rigid between the different previous frame and the different present frame.

5. The computer-implemented method of claim 1, wherein determining that the portion of the multi-segment articulated body system remained substantially rigid comprises determining at least one of:

relative positions of segments within the portion of the multi-segment articulated body system remained unchanged; or angles between segments within the portion of the multi-segmented articulated body system remained unchanged.

6. The computer-implemented method of claim 1, wherein determining that the portion of the multi-segment articulated body system remained substantially rigid comprises determining a change in pose of the portion of the multi-segment articulated body system can be substantially described by one or more of:

a translation of the portion of the multi-segment articulated body system as a whole; or a rotation of the portion of the multi-segment articulated body system as a whole.

7. The computer-implemented method of claim 1, wherein the first pose estimation computation, when performed, consumes fewer computing resources that does the second pose estimation computation when performed.

8. The computer-implemented method of claim 1, wherein the first pose estimation computation produces one or more of:

an estimated translation of the portion of the multi-segment articulated body system as a rigid system; or an estimated rotation of the portion of the multi-segment articulated body system as a rigid system.

9. The computer-implemented method of claim 1, wherein the first pose estimation computation takes as input information previously processed from one or more previous frames of the video stream but not information from the present frame of the video stream.

10. The computer-implemented method of claim 1, wherein the second pose estimation computation takes as input the present frame of the video stream.

11. A system comprising:
at least one physical processor;
physical memory comprising computer-executable instructions that, when executed by the physical processor, cause the physical processor to:
  receive a present frame of a video stream, the present frame comprising a present depiction of a multi-segment articulated body system;
  identify a previous frame of the video stream that comprises a previous depiction of the multi-segment articulated body system;
  analyze the present frame and the previous frame to determine whether a portion of the multi-segment articulated body system remained substantially rigid between the previous frame and the present frame; and
  estimate a pose of the multi-segment articulated body system in the present frame using a first pose estimation computation that treats the portion of the multi-segment articulated body system as rigid and that is selected in contrast to a second pose estimation computation based on determining that the portion of the multi-segment articulated body system remained substantially rigid between the previous frame and the present frame.

12. The system of claim 11, wherein the portion of the multi-segment articulated body system comprises a hand.

13. The system of claim 11, wherein the estimating the pose of the multi-segment articulated body system comprises estimating a spatial configuration of the multi-segment articulated body system, the spatial configuration comprising at least one of:

a spatial position of one or more segments of the multi-segment articulated body system;

a spatial position of one or more joints connecting one or more segments of the multi-segment articulated body system; or an angle between one or more joint-connected segments of the multi-segment articulated body system.

14. The system of claim 11, wherein the computer-executable instructions further cause the physical processor to:

receive a different present frame of the video stream comprising a different present depiction of the multi-segment articulated body system;

identify a different previous frame of the video stream that comprises a different previous depiction of the multi-segment articulated body system;

analyze the different present frame and the different previous frame to determine whether the portion of the multi-segment articulated body system remained substantially rigid between the different previous frame and the different present frame; and estimate a different pose of the multi-segment articulated body system in the different present frame using the second pose estimation computation that does not treat the portion of the multi-segment articulated body system as rigid and that is selected in contrast to the first pose estimation computation based on determining that the portion of the multi-segment articulated body system did not remain substantially rigid between the different previous frame and the different present frame.

15. The system of claim 11, wherein determining that the portion of the multi-segment articulated body system remained substantially rigid comprises determining at least one of:

relative positions of segments within the portion of the multi-segment articulated body system remained unchanged; or angles between segments within the portion of the multi-segmented articulated body system remained unchanged.

16. The system of claim 11, wherein determining that the portion of the multi-segment articulated body system remained substantially rigid comprises determining a change in pose of the portion of the multi-segment articulated body system can be substantially described by one or more of:

a translation of the portion of the multi-segment articulated body system as a whole; or a rotation of the portion of the multi-segment articulated body system as a whole.

17. The system of claim 11, wherein the first pose estimation computation, when performed, consumes fewer computing resources that does the second pose estimation computation when performed.

18. The system of claim 11, wherein the first pose estimation computation produces one or more of:
   an estimated translation of the portion of the multi-segment articulated body system as a rigid system; or
   an estimated rotation of the portion of the multi-segment articulated body system as a rigid system.

19. The system of claim 11, wherein the first pose estimation computation takes as input information previously processed from one or more previous frames of the video stream but not information from the present frame of the video stream.

20. A non-transitory computer-readable medium comprising one or more computer-executable instructions that, when executed by at least one processor of a computing device, cause the computing device to:

receive a present frame of a video stream, the present frame comprising a present depiction of a multi-segment articulated body system;

identify a previous frame of the video stream that comprises a previous depiction of the multi-segment articulated body system;

analyze the present frame and the previous frame to determine whether a portion of the multi-segment articulated body system remained substantially rigid between the previous frame and the present frame; and estimate a pose of the multi-segment articulated body system in the present frame using a first pose estimation computation that treats the portion of the multi-segment articulated body system as rigid and that is selected in contrast to a second pose estimation computation based on determining that the portion of the multi-segment articulated body system remained substantially rigid between the previous frame and the present frame.

* * * * *